US008726103B2

(12) United States Patent
Lee

(10) Patent No.: US 8,726,103 B2
(45) Date of Patent: May 13, 2014

(54) VISUAL OUTAGE MANAGEMENT TOOL

(75) Inventor: Brian Lee, Plainfield, IL (US)

(73) Assignee: AT & T Intellectual Property I, LP, Atlanta, GA (US)

( * ) Notice: Subject to any disclaimer, the term of this patent is extended or adjusted under 35 U.S.C. 154(b) by 370 days.

(21) Appl. No.: 12/962,215

(22) Filed: Dec. 7, 2010

(65) Prior Publication Data

US 2012/0144250 A1    Jun. 7, 2012

(51) Int. Cl.
*G06F 11/00* (2006.01)

(52) U.S. Cl.
USPC .......................................................... 714/57

(58) Field of Classification Search
USPC ........ 714/37, 38.1, 39, 40, 45, 46, 47.1, 47.2, 714/47.3, 48–50, 57
See application file for complete search history.

(56) References Cited

U.S. PATENT DOCUMENTS

| 5,720,018 | A  * | 2/1998  | Muller et al. ................. 345/581 |
| 6,253,337 | B1 * | 6/2001  | Maloney et al. ........... 714/38.14 |
| 6,502,131 | B1   | 12/2002 | Vaid et al. |
| 6,751,661 | B1   | 6/2004  | Geddes |
| 6,985,944 | B2   | 1/2006  | Aggarwal |
| 7,159,022 | B2   | 1/2007  | Primm et al. |
| 7,206,972 | B2   | 4/2007  | Wilson et al. |
| 7,529,838 | B2   | 5/2009  | Primm et al. |
| 7,734,775 | B2 * | 6/2010  | Barnett et al. ................. 709/224 |
| 7,752,301 | B1   | 7/2010  | Maiocco et al. |
| 7,769,840 | B1   | 8/2010  | House et al. |
| 8,166,157 | B2 * | 4/2012  | Couture et al. ............... 709/224 |
| 8,396,952 | B2 * | 3/2013  | Decusatis et al. ............ 709/223 |
| 2006/0256727 | A1 * | 11/2006 | Acharya et al. ................ 370/244 |
| 2007/0058631 | A1 * | 3/2007  | Mortier et al. ................ 370/392 |
| 2008/0059625 | A1 * | 3/2008  | Barnett et al. ................ 709/223 |
| 2008/0126858 | A1 * | 5/2008  | Barras ............................. 714/25 |
| 2010/0122175 | A1 * | 5/2010  | Gupta et al. ................... 715/735 |
| 2011/0004071 | A1 * | 1/2011  | Faiola et al. .................. 600/300 |
| 2011/0078305 | A1 * | 3/2011  | Varela ........................... 709/224 |
| 2012/0278477 | A1 * | 11/2012 | Terrell et al. ................. 709/224 |

* cited by examiner

*Primary Examiner* — Nadeem Iqbal
(74) *Attorney, Agent, or Firm* — Fay Kaplun & Marcin, LLP

(57) ABSTRACT

Described herein are systems related to a visual tool for providing a dynamic and accessible collaborative environment during a production outage or network downtime. An outage management tool comprising a server application tool receiving and storing monitoring data related to an operation of a network and application-level components of the network, wherein the monitoring data includes outage information corresponding to one of the network and the application-level components, and a visualization tool generating an interactive representation of the network including the outage information, the visualization tool and generating, in response to a request, an adjusted interactive representation of the network including application-level components affected by an outage and event traffic related to the outage.

20 Claims, 6 Drawing Sheets

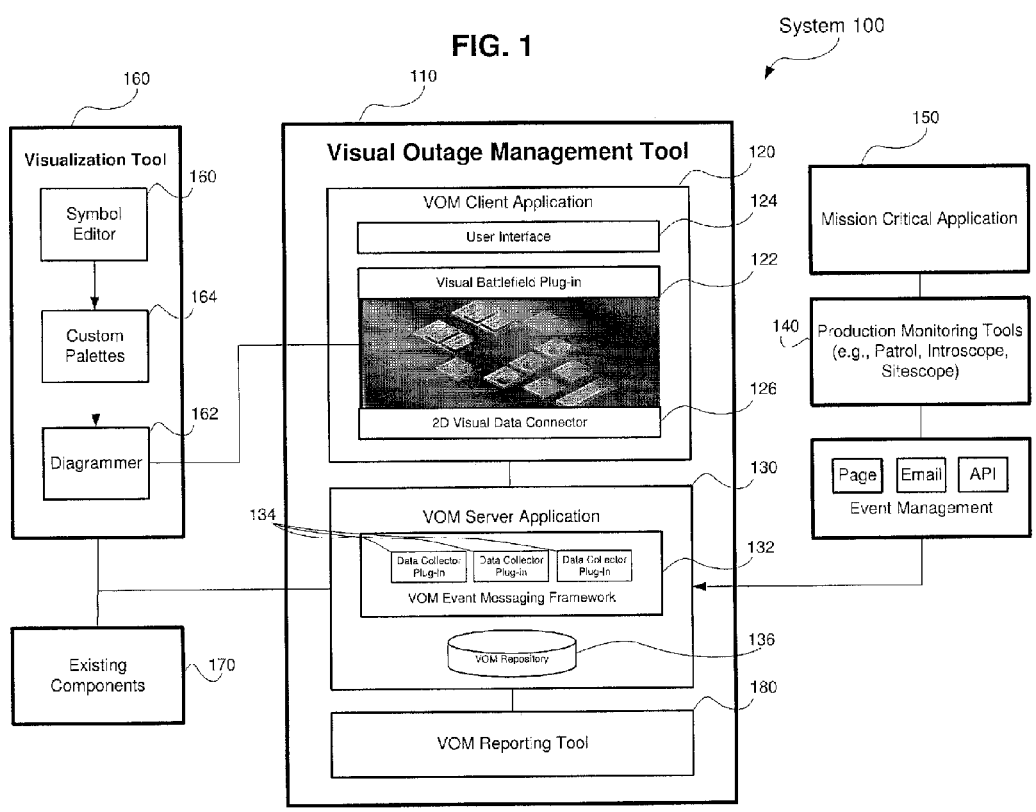

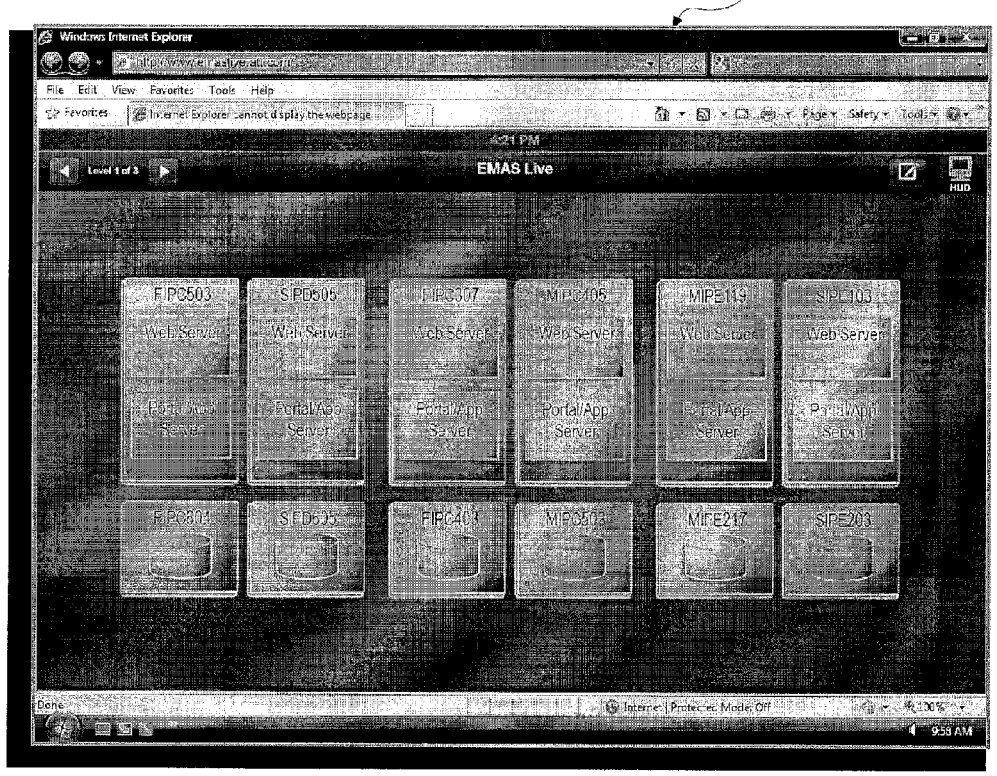
FIG. 2  Screen View 200

FIG. 3  Screen View, 300
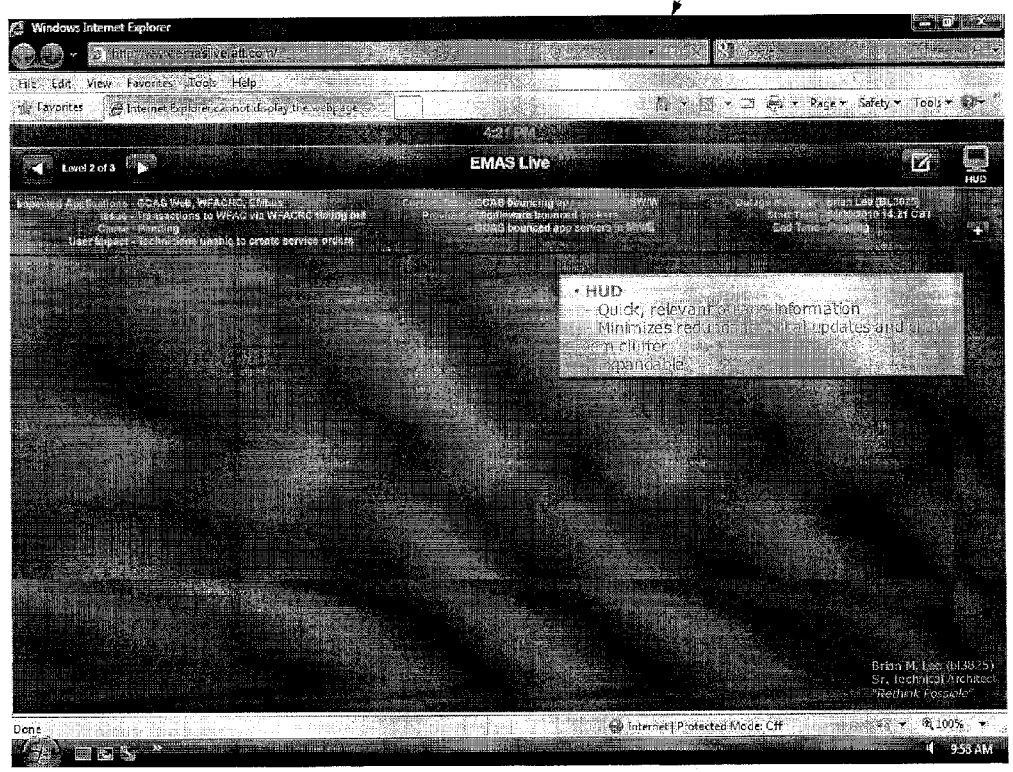

FIG. 4  Screen View 400
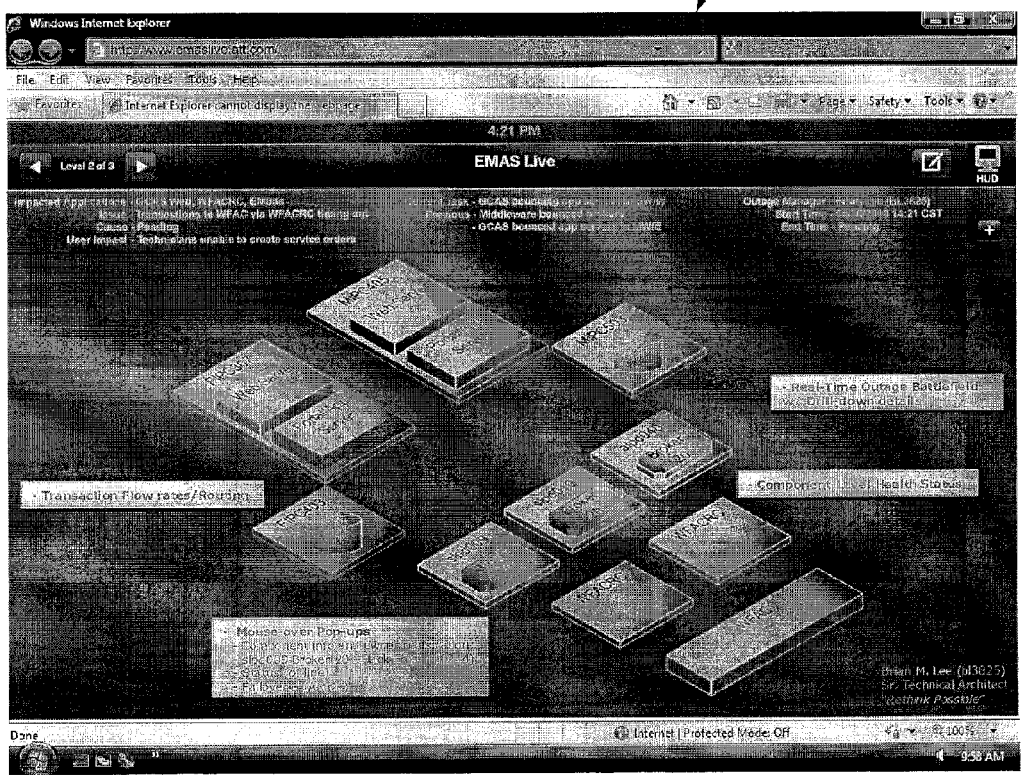

FIG. 5  Screen View 500
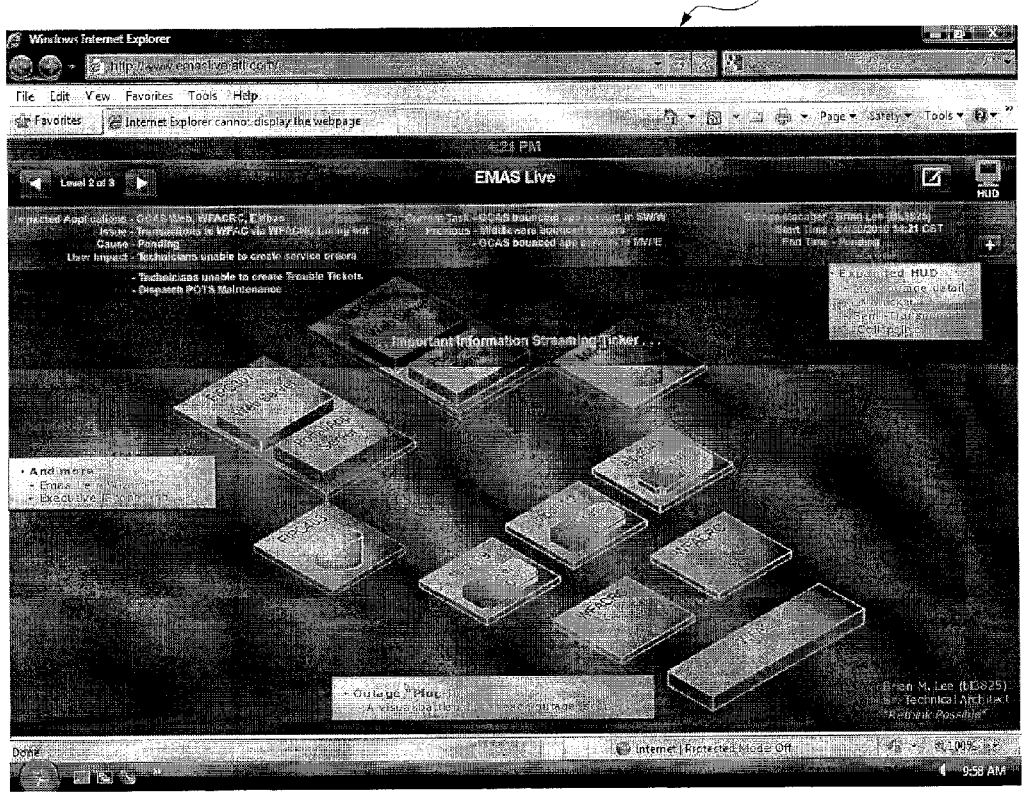

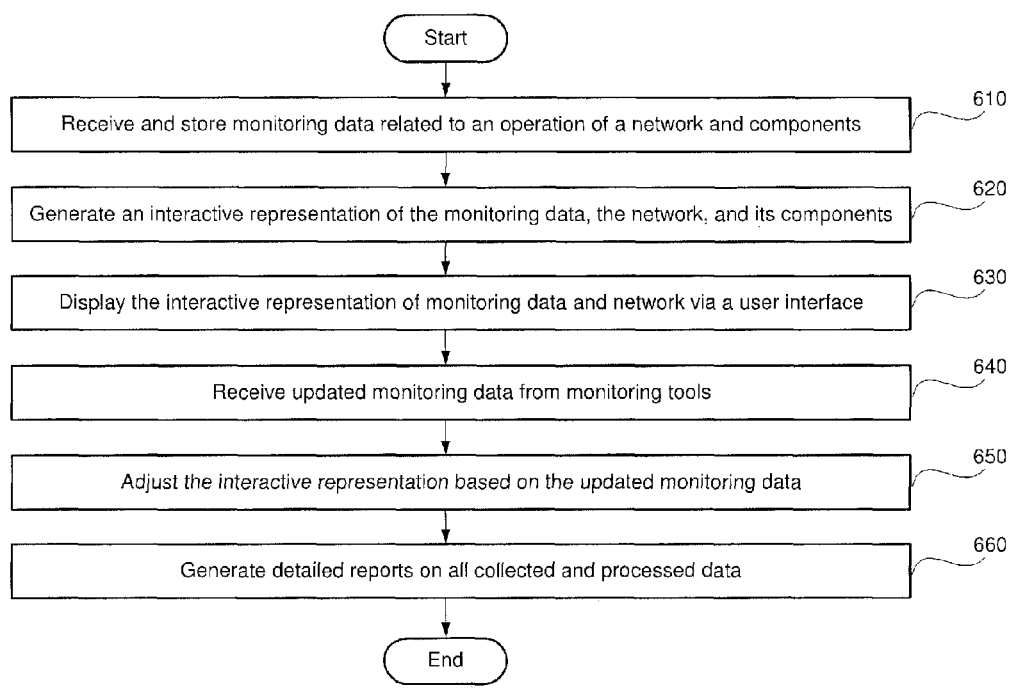

VISUAL OUTAGE MANAGEMENT TOOL

BACKGROUND

The terms "downtime" and "network outage" are used to refer to periods when a communication system is unavailable. Downtime or outage duration refers to a period of time that a system fails to provide or perform its functions. The causes of a network outage include failures in various network components such as: hardware failures (e.g., servers and other physical equipment), software failures (e.g., logic controlling equipment), interconnecting equipment failures (e.g., cables, routers, etc.), wireless transmission failures (e.g., antennas, satellites, etc.), and capacity failures (e.g., exceeding system limits).

Typically, it is the responsibility of the network designers to ensure that a network outage does not happen. However, if a network outage does occur, a network monitoring system may reduce the effects of the outage by detecting and restoring the network as quickly as possible. The restoration of the network generally requires involvement from several individuals and teams of individuals including technical engineers, management personnel, executives, etc.

Within the field of telecommunications, mission critical applications, interfaces, middleware components and downstream systems are continually changing. With these changes come increased difficulty and challenges for engineers and support team members to stay up to date with the technical picture and their understandings of related components involved in the early stages of the outage, and throughout critical triage activities. In a time when minutes equals millions, communication and collaboration amongst telecommunication personnel during a network outage is antiquated and inefficient. Currently, there exists a critical knowledge and communication gap between interested parties (e.g., engineers, executives, etc.) due to a lack of a complete picture of precisely what is occurring during the outage as well as the impact created by the outage.

SUMMARY

Described herein are systems related to a visual tool for providing a dynamic and accessible collaborative environment during a production outage or network downtime. An outage management tool comprising a server application tool receiving and storing monitoring data related to an operation of a network and application-level components of the network, wherein the monitoring data includes outage information corresponding to one of the network and the application-level components, and a visualization tool generating an interactive representation of the network including the outage information, the visualization tool and generating, in response to a request, an adjusted interactive representation of the network including application-level components affected by an outage and event traffic related to the outage.

Further described herein is a non-transitory computer readable storage medium including a set of instructions that are executable by a processor, the set of instructions being operable at least to receive and store, by a server application tool, monitoring data related to an operation of a network and application-level components of the network, wherein the monitoring data includes outage information corresponding to one of the network and the application-level components, and to generate, by a visualization tool, an interactive representation of the network including the outage information, the visualization tool and generating, in response to a request, an adjusted interactive representation of the network including application-level components affected by the outage and event traffic related to the outage.

BRIEF DESCRIPTION OF THE DRAWINGS

FIG. 1 shows an exemplary system for providing a visual representation of software and network monitoring data across various components according to an exemplary embodiment.

FIG. 2 shows an exemplary screen view of modular plug-ins for various application production environments available for monitoring via the visual outage management ("VOM") tool according to an exemplary embodiment.

FIG. 3 shows an exemplary screen view for monitoring network and software via the VOM tool according to an exemplary embodiment.

FIG. 4 shows an exemplary screen view of the real-time visual battlefield (e.g., visual representation of an outage) displayed by the VOM tool according to an exemplary embodiment.

FIG. 5 shows an expanded exemplary screen view of the visual battlefield displayed by the VOM tool according to an exemplary embodiment.

FIG. 6 shows an exemplary method for providing a visual representation of software and network monitoring data across various components according to an exemplary embodiment.

DETAILED DESCRIPTION

The exemplary embodiments described herein may be further understood with reference to the following description and the related appended drawings, wherein like elements are provided with the same reference numerals. The exemplary embodiments are related to a visual tool for providing a dynamic and accessible collaborative environment during a production outage or network downtime, such as a P1 production outage.

During a network outage, communication across different levels of personnel may rely on "chat rooms" and conference calls in order to diagnose and troubleshoot the outage. However, these procedures are neither effective nor efficient enough to service a mission critical production outage, such as a P1 outage. Consequently, status updates are continuously in outdated and/or redundant resulting in technical engineers being inefficiently informed as to the depth and breadth of an outage. Timely communication and collaboration amongst technical engineers and between other levels of personnel can drastically improve the understanding and analysis of the outage as well as the restoration of the involved components and networks. Chat rooms and conference calls alone are simply not effective enough to suitably address and resolve mission critical applications and systems when added minutes in response time costs millions in revenue and resources.

As will be described below, the exemplary embodiments are related to a socially collaborative software application for articulating the scope of a production outage by providing a live, continually updating (e.g., "real-time"), and visual representation of various network components involved in the outage. In other words, this visual tool creates a robust, user-friendly, highly interactive production monitoring system and communication tool. An exemplary software application may be referred to as a visual outage management ("VOM") tool. Accordingly, the VOM tool may allow concerned parties (e.g., outage attendees, technical engineers, management and executive team members, etc.) to effectively understand, communicate and contribute to resolving a production outage. Furthermore, an exemplary VOM tool may provide a public dashboard of sorts, to the benefit outage attendees of all skill levels. The socially collaborative environment of the VOM tool may differentiate this visual tool from any other network diagnostic/mapping systems used during network outages.

The VOM tool helps bridge the gap between technical, managerial, and executive levels during a critical outage call. The 3 dimensional ("3D") representation may be provided through various software components, such as "visual battlefield" plug-ins. One skilled in the art would understand that a plug-in may refer to a set of software components that adds specific capabilities to a larger software application, thereby allowing for customizations to the functionality of the application. Accordingly, the visual battlefield plug-ins described herein may facilitate improved focus and communication in order to allow for a more effective utilization of time, effort and resources during this critical outage period. Therefore, the VOM tool may greatly reduce the mean time to repair ("MTTR") while providing significant cost-avoidance opportunities. It should be noted that the exemplary VOM tool may be leveraged using existing production components and documentations.

FIG. 1 shows an exemplary system 100 for providing a visual representation of software and network monitoring data across various components according to an exemplary embodiment. The system 100 may include a visual outage management tool, or VOM tool 110, for receiving, processing, and displaying data related to the network and its components in a socially collaborative environment. The VOM tool 110 may include applications and tools, such as a VOM Server Application 130 for collecting network data, a VOM Client Application 120 for reporting network data, and a VOM reporting tool 180. According to the exemplary embodiments of the system 100, the VOM tool 110 may be a web-based piece of software (e.g., such as a Java/Webstart enabled application). Accordingly, the VOM tool 110 may operate directly through the Internet using a web browser. In addition, this web-based VOM tool 110 may interact with existing components 170 in order to ensure consistency of data between multiple systems and organizations, while allowing users to generate reports that are meaningful to several different levels of personnel (e.g., engineers, management, executive, etc.).

The VOM Server Application 130 may collect data from production monitoring tools 140 (e.g., Patrol, Introscope, Sitescope, etc.) while monitoring one or more mission critical applications 150. In addition, further data may be received and imported into the VOM tool 110 from components such as visualization systems 160 (e.g., IBM ILOG JViews, etc.) and the other existing components 170. According to exemplary embodiments, the VOM Server Application 130 may include a VOM Event Messaging Framework 132 to facilitate event traffic to and from the production monitoring tools 140 and the VOM Client Application 114, and thus, the user. Event traffic may include information such as network status, application-level component status, affected components, impacted applications, outage issues, outage causes, user impact details, current tasks being performed, prior task performed, task progress, individual technicians and other personnel involved in the outage, etc.

The VOM Server Application 130 may also include data collection plug-ins 134, event filter logic, and a VOM repository 136. The VOM data collector plug-ins 134 may be described as individual sub-modules corresponding to each of the components of the monitoring tools 140 that interact with the VOM Server Application 130. For instance, these plug-ins 134 may interact with the individual monitoring tools 140 at an application programming interface ("API") level utilizing a monitoring technology such as Java Management Extensions ("JMX"). The VOM repository 136 may include a library of visual components that are associated with various available outage battlefields. Accordingly, the VOM repository 136 may include data regarding outage details, historical information, metrics, key learning summaries, etc.

Once monitoring data has been collected and retained by the VOM Server Application 130 of the VOM tool 110, the data may be processed and transferred to the VOM Client Application 120. The VOM Client Application 120 may include an embedded visual battlefield plug-in 122, a primary user interface 124, and a 2D data connector framework 126. The 2D data connector framework 126 may enable fast, double-buffered updates to the visual battlefield plug-in 122 via data sources. As will be described in greater detail below, the visual battlefield plug-in 142 may be defined and constructed from components of the visualization systems 160, specifically a JViews Diagrammer 162.

As noted above, the visualization systems 160 interacting with the VOM tool 110 may be a plurality of IBM ILOG JViews. For instances, the visualization systems 160 may include a diagrammer (e.g., JViews Diagrammer 162), a symbol editor ((e.g., JViews Symbol Editor 164), and custom palettes (e.g., JViews Palette 166).

The JViews Diagrammer 162 may assist in the creation of visual dashboards and/or diagrams within the visual battlefield plug-in 142. These dashboards and diagrams may include visual representations of network or application-level components. Furthermore, the dashboards and diagrams may also include data connection stubs to allow data to access from various data sources (e.g., XML, flat files, databases, etc.). Once these dashboards and diagrams are defined with data sources, production outages may be visual represented as "battlefields" wherein dashboards and diagrams correspond to specific outage scenarios.

The JViews Symbol Editor 164 may be defined as a utility for creating visual symbols (e.g., Java 2D symbols) that represent various network and application-level components. Accordingly, these symbols may be utilized by the JViews Diagrammer 162 in the creation of visual production outage battlefield scenarios as a part of the VOM user interface 124.

The JViews Palette 166 may be defined as a library of symbols that are created using the The JViews Symbol Editor 164. The palette of symbols may be imported directly into the JViews Diagrammer 162 in order to construct dashboards and diagrams for exportation and use by a host of applications of the VOM tool 110.

Through the use of each of these visualization tools 160, the visual battlefield plug-in 126 may quickly articulate the scope of an outage by generating a real-time, interactive, 3D visual representation of the outage components. This visual representation may be continuously updated and displayed to the user via the user interface 124 as a visual battlefield.

The VOM reporting tool 180 may generate various report of the monitoring data, wherein the report includes post-outage metrics, diagnosis data, and resolution data related to an outage. For instance, detailed reports may be generated from the collected and processed data, such as, but not limited to, the monitoring data, diagnostic data, resolution data, visual plug-in data, customizable symbols, user input, etc.

According to the exemplary embodiments, the exemplary VOM tool 110 may provide all levels of personnel with the ability to manage and monitor a production outage at a more meaningful and useful level of detail, while also helping to facilitate communication and collaboration. In addition, technical engineers will benefit by having better insight into the underlying scope of the outage, as well as the progress being made. Using information collected by the VOM tool 110, the tool 110 may also generate reports on based on the events and communications occurring before, during and after an outage.

FIG. 2 shows an exemplary screen view 200 of plug-ins for various application production environments available for monitoring via the visual outage management ("VOM") tool 110 according to an exemplary embodiment. As described above, the VOM tool 110 may utilize modular plug-ins for visually monitoring production environments, such as networks and their application-level components. Each of the plug-ins may be an interactive visual representation of any number of servers (e.g., web servers, portal/application servers, etc.), databases, and other components of the network being monitored.

The monitored data may include statistics related to memory, heap sizes, transaction flow rates, etc. Accordingly, the VOM tool 110 may continuously collect and process monitoring data whether or not an outage is present (e.g., before, during and after an outage event). This exemplary screen view 200 may be displayed to a user via the user interface 124, thereby providing the user with access to each of these plug-ins, as well as their respective monitoring data.

FIG. 3 shows an exemplary screen view 300 for monitoring network and software via the VOM tool 110 according to an exemplary embodiment. The exemplary screen view 300 may include visual elements such as a toolbar and an expandable heads-up display ("HUD") providing instant outage information relevant to a monitored network. The toolbar may provide the user with easy access to display options and various statistical reporting data (e.g., outage histories, current network statistics, etc.). The HUD may manage ongoing communications between all involved parties in order to minimize redundant updates and inquiries. The HUD may keep track of pertinent information such as the business impact of an outage, the duration of an outage, and the ongoing work tasks being performed to resolve the outage. The information available on the HUD may be up-to-date and available at all times while outage attendees enter and exit the proceedings. This exemplary screen view 300 may be displayed to a user via the user interface 124 of the VOM tool 110.

FIG. 4 shows an exemplary screen view 400 of the real-time visual battlefield 122 (e.g., visual representation of an outage) displayed by the VOM tool 110 according to an exemplary embodiment. Using the visual battlefield 122 displayed in screen view 400, users may view 3D visual displays of outage components and interact with the screen view 400 in order to obtain relevant information regarding different aspects of an outage. The information displayed in screen view 400 may include, for example, transaction flow rates, flow routing, component-level health status, etc. In addition, each of the 3D visual displays may include "drill-down" capabilities that allow the user to gain greater insight as to the breadth and depth of the outage, as well as gain a clearer, more holistic view of the network and its components. Furthermore, the user may "mouse-over" these 3D visual displays to receive bullet-point information via an on-screen pop-up. This exemplary screen view 300 may be displayed to a user via the user interface 124 of the VOM tool 110.

FIG. 5 shows an expanded exemplary screen view 500 of the visual battlefield 122 displayed by the VOM tool 110 according to an exemplary embodiment. Specifically, the screen view 500 shows an expanded HUD, providing greater details to the user. For instance, these greater details may include a live streaming ticker, or "crawl," displaying important outage information. Accordingly, the VOM tool 110 may provide continuous, detailed information and updates to all levels of outage attendees (engineers, management, executive, etc.). Regardless of an individual's technical knowledge or level of involvement in resolving the outage, the HUD of the VOM tool 110 reduces the interface learning curve by providing a user-friendly and highly-accessible communication environment.

FIG. 6 shows an exemplary method 600 for providing a visual representation of software and network monitoring data across various components according to an exemplary embodiment. It should be noted that method 600 will be discussed with reference to tool 110 and components of the system 100 of FIG. 1. As described above, the VOM tool 110 allows for any user to "check in" and monitor various components of a network, such as the user's area of responsibility.

It should be noted that the exemplary method may stored as a set of instructions or software code on a non-transitory computer readable storage medium, such as a computer memory. Accordingly, this set of instructions may be executable by a processor and may be operable at least to perform the steps of the exemplary method 600 depicted in FIG. 6.

Beginning with step 610, the VOM tool 110 may receive and store monitoring data related to an operation of a network and its application-level components. For instance, upon processing the monitoring data, the VOM tool 110 may reveal that one or more mission critical applications are down, or otherwise malfunctioning. Accordingly, this malfunctioning application may lead to further downstream applications fails to function, and thus, an outage.

In step 620, the VOM tool 110 may generate an interactive representation of the received monitoring data, as well as the network and its components. The interactive representation may identify the specific application that is causing the outage and magnify the monitoring data of this application.

In step 630, the VOM tool 110 may display the interactive representation of the data to a user. In addition, the VOM tool 110 may display details of all parties (e.g., teams and individuals) involved with the resolution of the outage. Furthermore, the VOM tool 110 may receive user input, such a request for more detailed information on a specific component of the data. Accordingly, the VOM tool 110 may provide the additional data upon user request.

In step 640, the VOM tool 110 may receive updated monitoring data. As noted above, the VOM tool 110 may display real-time monitoring data of the network and its components. As information related to the network set-up and/or performance of these components change, the VOM tool 110 may receive and process these changes.

In step 650, the VOM tool 110 may adjust the interactive representation based on the updated monitoring data. Accordingly, the VOM tool 110 may provide an up-to-date representation of the network and its components to all users via the user interface 124.

In step 660, the reporting tool 180 of the VOM tool 110 may generate detailed reports on all collected and processed data, such as, but not limited to, the monitoring data, diagnostic data, resolution data, visual plug-in data, customizable symbols, user input, etc.

According to the exemplary embodiments, the VOM 110 and the corresponding method 600 may allow for efficient communication and collaboration amongst all levels of personnel involved in an outage. As an outage goes through various stages of diagnosis, and different work tasks are performed to resolve the issues, the VOM tool 110 provides a cohesive glue necessary to keep all attendees (technical, managerial, etc.) on the same page. The VOM tool 110 may provide visual status updates, component-level attendance, an accessible HUD, history tracking and reporting, relative health and process details, as well as metrics and key learnings for post-outage analysis and consumption. Furthermore, since the VOM tool 110 operates with existing components in a network, the VOM tool 110 provides this capability without the high cost of large enterprise applications having limited capabilities.

From a broader perspective, the VOM tool 110 allows for a reduction in mean time to repair ("MTTR") during a critical outage. Furthermore, the VOM tool 110 may provide useful and insightful monitoring metrics and charts, graphs, and reports that result in improved decision making. The monitoring data may be tracked during all stages of operation (e.g., before, during and after an outage). Thus, the VOM tool 110 may effectively contribute to the achievement of increased clarity and understanding as to the scope and severity of the outage for all outage attendees.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. An outage management tool, comprising:
   a server application tool receiving and storing monitoring data related to an operation of a network and application-level components of the network, wherein the monitoring data includes outage information corresponding to one of the network and the application-level components; and
   a visualization tool generating an interactive representation of the network including the outage information, the interactive representation including a three-dimensional depiction of the network, the three-dimensional depiction providing a pictorial representation of the application-level components of the network, the pictorial representation representing each of the application-level components in a same relationship to the remaining application-level components as in the network, the visualization tool generating, in response to a request, an adjusted interactive representation of the network including application-level components affected by an outage and event traffic related to the outage.

2. The outage management tool of claim 1, wherein the server application tool includes a messaging framework for controlling the event traffic between the server application tool and a monitoring tool.

3. The outage management tool of claim 1, wherein the server application tool receives updated monitoring data and transmits the updated monitoring data to the visualization tool.

4. The outage management tool of claim 1, wherein the visualization tool includes one of a diagrammer building the interactive representation, a customizable palette of symbols, and a symbol editor for adjusting the symbols.

5. The outage management tool of claim 4, wherein the interactive representation includes a three-dimensional rendering of the network and application-level components constructed by the diagrammer.

6. The outage management tool of claim 1, wherein the interactive representation is transmitted to a client application tool for displaying the monitoring data, wherein the request is user input received from the client application tool.

7. The outage management tool of claim 1, wherein the outage management tool is a browser-based software application.

8. The outage management tool of claim 1, wherein the server application tool includes a repository storing the monitoring data and historical network operation data.

9. The outage management tool of claim 1, further including:
   a reporting tool generating a report of the monitoring data, wherein the report includes post-outage metrics, diagnosis data, and resolution data related to the outage.

10. The outage management tool of claim 1, wherein the event traffic includes information related to one of network status, application-level component status, affected components, impacted applications, outage issues, outage causes, user impact details, current tasks being performed, prior task performed, task progress, personnel involved in the outage.

11. A non-transitory computer readable storage medium including a set of instructions that are executable by a processor, the set of instructions, when executed by the processor, causing the processor to perform operations comprising:
    receiving and storing, by a server application tool, monitoring data related to an operation of a network and application-level components of the network, wherein the monitoring data includes outage information corresponding to one of the network and the application-level components;
    generating, by a visualization tool, an interactive representation of the network including the outage information, the interactive representation including a three-dimensional depiction of the network, the three-dimensional depiction providing a pictorial representation of the application-level components of the network, the pictorial representation representing each of the application-level components in a same relationship to the remaining application-level components as in the network, the visualization tool generating, in response to a request, an adjusted interactive representation of the network including application-level components affected by the outage and event traffic related to the outage.

12. The non-transitory computer readable storage medium of claim 11, wherein the server application tool includes a messaging framework for controlling the event traffic between the server application tool and a monitoring tool.

13. The non-transitory computer readable storage medium of claim 11, wherein the operations further comprise:
    receiving updated monitoring data; and
    transmitting the updated monitoring data to the visualization tool.

14. The non-transitory computer readable storage medium of claim 11, wherein the visualization tool includes one of a diagrammer building the interactive representation, a customizable palette of symbols, and a symbol editor for adjusting the symbols.

15. The non-transitory computer readable storage medium of claim 14, wherein the interactive representation includes a three-dimensional rendering of the network and application-level components constructed by the diagrammer.

16. The non-transitory computer readable storage medium of claim 11, wherein the interactive representation is transmitted to a client application tool for displaying the monitoring data, wherein the request is user input received from the client application tool.

17. The non-transitory computer readable storage medium of claim 11, wherein the instructions are performed via a browser-based software application.

18. The non-transitory computer readable storage medium of claim 11, wherein the server application tool includes a repository storing the monitoring data and historical network operation data.

19. The non-transitory computer readable storage medium of claim 11, wherein the operations further comprise:
   generating, by a reporting tool, a report of the monitoring data, wherein the report includes post-outage metrics, diagnosis data, and resolution data related to an outage.

20. The non-transitory computer readable storage medium of claim 11, wherein the event traffic includes information related to one of network status, application-level component status, affected components, impacted applications, outage issues, outage causes, user impact details, current tasks being performed, prior task performed, task progress, personnel involved in the outage.

* * * * *